(12) United States Patent
Alsop et al.

(10) Patent No.: US 12,210,780 B2
(45) Date of Patent: Jan. 28, 2025

(54) FILTERED RESPONSES OF MEMORY OPERATION MESSAGES

(71) Applicant: Advanced Micro Devices, Inc., Santa Clara, CA (US)

(72) Inventors: Johnathan Robert Alsop, Seattle, WA (US); Shaizeen Dilawarhusen Aga, Santa Clara, CA (US); Mohamed Assem Abd Elmohsen Ibrahim, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 76 days.

(21) Appl. No.: 17/954,748

(22) Filed: Sep. 28, 2022

(65) Prior Publication Data
US 2024/0106782 A1    Mar. 28, 2024

(51) Int. Cl.
*G06F 3/06* (2006.01)
(52) U.S. Cl.
CPC .......... *G06F 3/0673* (2013.01); *G06F 3/0611* (2013.01); *G06F 3/0653* (2013.01); *G06F 3/0659* (2013.01)
(58) Field of Classification Search
None
See application file for complete search history.

(56) References Cited

U.S. PATENT DOCUMENTS

| | | | | |
|---|---|---|---|---|
| 7,809,868 | B1* | 10/2010 | Mu | G06F 3/0683 |
| | | | | 710/5 |
| 7,908,656 | B1* | 3/2011 | Mu | G06F 21/6218 |
| | | | | 726/22 |
| 8,335,860 | B2* | 12/2012 | Moran | H04L 67/2871 |
| | | | | 709/246 |
| 10,649,831 | B2* | 5/2020 | Tokoyoda | G06F 11/073 |
| 2015/0149490 | A1* | 5/2015 | Kim | G06F 16/2291 |
| | | | | 707/754 |
| 2016/0196356 | A1* | 7/2016 | Kim | G06F 16/24569 |
| | | | | 707/754 |
| 2018/0129737 | A1* | 5/2018 | Louie | G06F 16/335 |
| 2020/0342294 | A1* | 10/2020 | Jang | G06N 3/04 |
| 2024/0103730 | A1 | 3/2024 | Alsop et al. | |

(Continued)

OTHER PUBLICATIONS

Graham, Richard L, et al., "Scalable hierarchical aggregation protocol (SHArP): a hardware architecture for efficient data reduction", COM-HPC '16: Proceedings of the First Workshop on Optimization of Communication in HPC [retrieved May 19, 2022]. Retrieved from the Internet <https://network.nvidia.com/sites/default/files/pdf/solutions/hpc/paperieee_copyright.pdf>., Nov. 13, 2016, 10 pages.

(Continued)

*Primary Examiner* — Kaushikkumar M Patel
(74) *Attorney, Agent, or Firm* — FIG. 1 Patents

(57) ABSTRACT

In accordance with described techniques for filtered responses to memory operation messages, a computing system or computing device includes a memory system that receives messages. A filter component in the memory system receives the responses to the memory operation messages, and filters one or more of the responses based on a filterable condition. A tracking logic component tracks the one or more responses as filtered responses for communication completion.

20 Claims, 8 Drawing Sheets

(56) References Cited

U.S. PATENT DOCUMENTS

2024/0103876 A1* 3/2024 Agarwal ............... G06F 12/128

OTHER PUBLICATIONS

Klenk, Benjamin, et al., "An in-network architecture for accelerating shared-memory multiprocessor collectives", Proceedings of the ACM/IEEE 47th Annual International Symposium on Computer Architecture [retrieved Aug. 23, 2022]. Retrieved from the Internet <https://ieeexplore.ieee.org/stamp/stamp.jsp?arnumber=9138924>., Sep. 23, 2020, 14 Pages.

Sapio, Amedeo, et al., "In-Network Computation is a Dumb Idea Whose Time Has Come", Proceedings of the 16th ACM Workshop on Hot Topics in Networks [retrieved May 19, 2022]. Retrieved from the Internet <https://sands.kaust.edu.sa/papers/daiet.hotnets17.pdf>., Nov. 30, 2017, 7 Pages.

* cited by examiner

```
(a) Fine-Grain Filter Interface                           202
# updates array B based on
# non-zero elements of A
for i in 0:N:
        R1 <- LD A[i]
        if R1 != 0
            R1 <- R1*const
            ST R1 -> B[i]
```

```
(b) Coarse-Grain Filter Interface                         204
# performs the same task as A but uses
# hardware-accelerated filter_and_push
# operator
filter_stack [N]
filter_and_push (A[0], N, filter_stack, VALUES | INDICES)
for element in filter_stack:
        B[element.idx] = element.value*const
```

FIG. 2

FILTERED RESPONSES OF MEMORY OPERATION MESSAGES

BACKGROUND

The processing and transfer of data in the memory of computing systems and devices utilizes various conventional techniques to facilitate task migration and offloading some near-memory processing tasks for an instruction thread, such as to process the instructions in device memory and return the requested results. Typically, consideration of whether to offload a processing task accounts for the overhead associated with data transfer latencies, such as when utilizing caches, processing in memory (PIM) devices, and/or other near-memory processing techniques in memory systems.

BRIEF DESCRIPTION OF THE DRAWINGS

The detailed description is described with reference to the accompanying figures.

FIG. 2 depicts non-limiting examples of a hardware-software filter interface functions to reduce data transfer and alleviate throughput restriction of a communication path for memory operation messages in example implementations of filtered responses to memory operation messages, as described herein.

DETAILED DESCRIPTION

Figure 1:
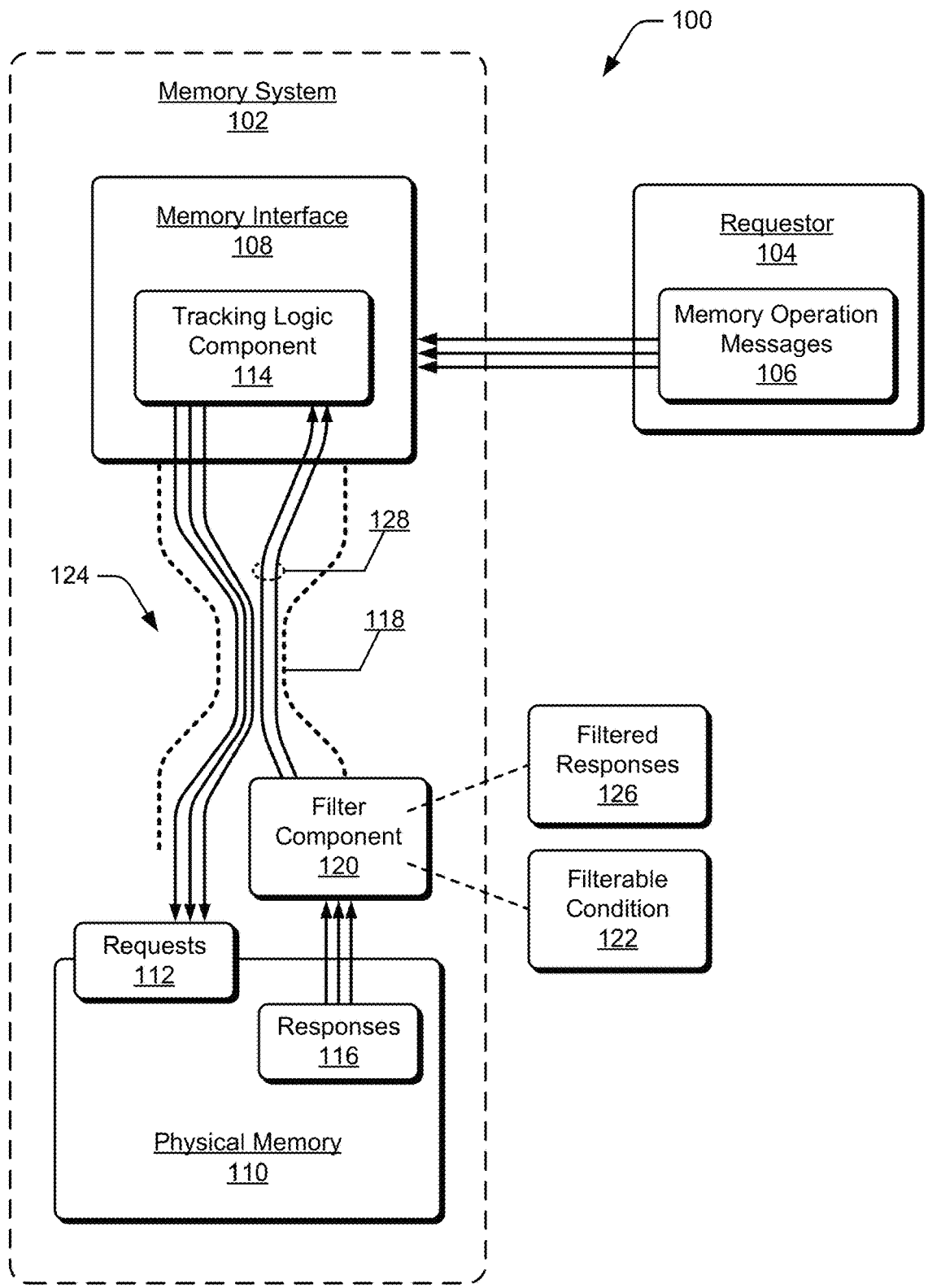
FIG. 1 is a block diagram of a non-limiting example system for filtered responses to memory operation messages, as described herein.

The transfer of data from memory to perform logic computations on the data in many computer systems or devices can become the dominant performance bottleneck, and this restriction gets worse as computing systems and devices advance. In many computer systems, this throughput bottleneck is attributable to the limited memory expressability of conventional von Neumann architectures, which can generally only issue load and store instructions, or a limited set of single-address read, modify, write (RMW) operations, and perform computations on the data once it has been transferred to local memory storage. Although RMW operations with no return value can be used to avoid transferring data back to a data requestor, they only reduce fifty percent (50%) of data transfer per access (the RMW operand must still be transferred to memory), and are limited in applicability, which does not reduce data transfer if all of the data to be reduced is already in memory.

Overall, the ability to perform computation on data has scaled much faster than the ability to move data in a computing system to computation components. This is evident in the memory wall, as well as in distributed systems where communication primitives, such as all-reduce and all-to-all are quickly becoming the dominant performance limiters of emerging computation workloads, such as for deep neural networks (DNNs). Notably, throughput limitations are due to conventional requestor-centric system implementations (e.g., the von Neumann model). For example, assuming that an instruction thread is assigned to an appropriate processing core, the thread issues memory requests for all of the data it needs to read or write, and the data is transferred to the requesting thread or core. The requested data is then processed and any output data is transferred or communicated from the requesting thread or core to a location in global memory.

As the ability of computing systems and devices to perform computations increases faster than the ability to transfer data between processing cores, aspects of data transfer are beginning to limit computation performance in computing systems and devices. Although local memory storage, such as caches, are used to reduce this type of data transfer by exploiting data reuse, this is only effective when there is local reuse and is inherently limited (e.g., cold misses while accessing memory are not avoided). As computing systems scale, data reuse will only degrade in performance, given that more instruction threads are needed to utilize the available processing cores, and these threads will have dependencies with other threads that inevitably require data movement between components (e.g., memory storage, processing cores, and/or any other components that store, process, utilize, and/or transfer data) at different node locations in a memory system.

Conventional solutions, such as task migration and processing in memory (PIM) are utilized to facilitate reducing data transfer, however existing implementations require software awareness of data locality and mapping in order to be effective. For example, a task migration should reduce overall data movement or transfer by enough to offset the processing overhead of transferring the task or thread context across the system. This is difficult to realize for fine-grain tasks, tasks that consume data from multiple different remote sources, and/or tasks that are programmed for a specialized platform (e.g., graphics processing unit (GPU) kernels). Similarly, PIM commands operate on data that is located in the same PIM-enabled memory module, and the reduced data transfer enabled by PIM should outweigh the cost of sending the PIM instructions from a requestor. Depending on the granularity of a task offload, the context transfer needed to perform a task remotely and track dependencies can also incur unacceptable overhead. Further, this can require expensive cache flushes on some devices (e.g., GPUs) to prevent reuse of stale data and propagation of dirty data to the remote executor.

Further, existing implementations of in-network computing generally rely on a non-coherent programming model requiring explicit transfer of data between nodes, static topologies, static routing, and regular access patterns. These designs are not portable to generic systems or functions. Overall, reducing the data movement in emerging computing systems using any of the above strategies involves consideration, as well as control of data mapping and compute mapping, in a way that makes it difficult to handle irregular or input-dependent behavior, new systems with different compute, memory, interconnect organizations, and non-deterministic resource sharing among multiple concurrent workloads.

Aspects of the described filtered responses to memory operation messages are implemented to improve and/or solve the problems of data transfer throughput in computing systems and devices. The described techniques address the data movement bottleneck in a memory system by implementing expressive memory request types that allow the memory system to condense data prior to transfer in a way that avoids much the of data movement that is incurred by conventional systems, and is amenable to many common filtering conditional patterns (e.g., equal, not equal, greater than, less than, etc.). Notably, aspects of the described techniques are implemented without requiring the requesting software (e.g., applications, or other device functions or procedures) to be aware of the physical location of the data in question. The hardware-software (HW/SW) interface is updated to directly reduce data transfer, but without imposing requirements on the software. In one or more implementations, aspects of filtered responses to memory operation messages are implemented with a set of memory request extensions that reduce data throughput at a very low hardware cost and without requiring awareness of data locality.

The described aspects of data filtering are ideal for this type of optimization. In many applications, a compute task reads multiple values from a remote location, but only utilizes the returned values that meet some condition. However, since the condition is dependent on the value, the memory system transfers all values across the bottleneck data transfer interface. If this conditional is evaluated prior to the performance bottleneck, data transfer is reduced by dropping or summarizing values that do not satisfy the conditional.

In aspects of the described techniques, a computing system or computing device includes a memory system that receives memory operation messages issued by a requestor. The requestor is, for example, any type of software, application, procedure, device function, device component, and/or system module that initiates the memory operation messages, such as read, modify, and write (RMW) memory operations. The memory system includes a memory interface (also referred to herein as a hardware-software (HW/SW) interface), which is the interface to a physical memory of the memory system. A filter component at a response node in the memory system receives responses to the memory operation messages, identifies a filterable condition of one or more of the responses, and filters the responses based on the filterable condition to reduce data throughput in a communication path in the memory system. This reduces data traffic in the memory system and improves performance, without delaying the responses to the memory request messages on the response path.

In some aspects, the techniques described herein relate to a memory system comprising a filter component to filter one or more of the responses to memory operation messages, and a tracking logic component to track the one or more responses as filtered responses for communication completion.

In some aspects, the techniques described herein relate to a memory system, where the filtered responses are at least one of identified as determined to fail a filterable condition or have a value that does not satisfy the filterable condition.

In some aspects, the techniques described herein relate to a memory system, where a value of a filtered response is an element of data from memory that will not be utilized.

In some aspects, the techniques described herein relate to a memory system, where the filtered responses are filtered based on at least one of specified information in the one or more responses, or configuration information programmed in the filter component.

In some aspects, the techniques described herein relate to a memory system, where non-filtered responses to the memory operation messages have a value that satisfies a filterable condition, and the non-filtered responses are communicated back through a communication path in the memory system.

In some aspects, the techniques described herein relate to a memory system, where the tracking logic component is configured to report a filtered response as a negative acknowledgement rather than as a data response.

In some aspects, the techniques described herein relate to a memory system, where the tracking logic component is configured to count a quantity of the filtered responses and report the quantity of the filtered responses.

In some aspects, the techniques described herein relate to a memory system, where the tracking logic component is configured to initiate a flush operation instructing the memory system to cease filtering and send pending filtered responses to their destination.

In some aspects, the techniques described herein relate to a computing device comprising a memory system to receive memory operation messages, and a filter component to receive responses to the memory operation messages and filter one or more of the responses based on a filterable condition.

In some aspects, the techniques described herein relate to a computing device, where the filter component is configured to filter the one or more responses as filtered responses based on at least one of specified information in the one or more responses, or configuration information programmed in a filter component.

In some aspects, the techniques described herein relate to a computing device including a tracking logic component to track the one or more responses as filtered responses for communication completion.

In some aspects, the techniques described herein relate to a computing device, where the tracking logic component is configured to report a filtered response as a negative acknowledgement rather than as a data response.

In some aspects, the techniques described herein relate to a computing device, where the tracking logic component is configured to count a quantity of the filtered responses and report the quantity of the filtered responses.

In some aspects, the techniques described herein relate to a computing device, where the filter component is configured to filter a response comprising multiple elements, where one or more of the multiple elements of the response satisfy the filterable condition and at least one of multiple elements does not satisfy the filterable condition, and one of filter the response if all of the multiple elements fail the filterable condition, filter the response if requested elements of the multiple elements are filterable, or split the multiple elements based on individual filterability and condense non-filterable elements of the multiple elements into a response message.

In some aspects, the techniques described herein relate to a method of filtering one or more responses to memory operation messages as filtered responses based on a filterable condition, the filtered responses having a value that does not satisfy the filterable condition, and tracking the filtered responses for reporting.

In some aspects, the techniques described herein relate to a method, where the one or more responses are identified as being filterable responses based on at least one of specified information in the one or more responses, or configuration information programmed in a filter component.

In some aspects, the techniques described herein relate to a method, where the value of a filtered response is an element of data from memory that will not be utilized.

In some aspects, the techniques described herein relate to a method including reporting a filtered response as a negative acknowledgement rather than as a data response.

In some aspects, the techniques described herein relate to a method including reporting a group of the filtered responses as at least one of negative acknowledgements grouped together, or as the negative acknowledgements appended to additional response messages.

In some aspects, the techniques described herein relate to a method including counting a quantity of the filtered responses and reporting the quantity of the filtered responses.

In some aspects, the techniques described herein relate to a method including reporting a non-filtered response as a location rather than as a data response.

In some aspects, the techniques described herein relate to a method including counting a quantity of non-filtered responses and reporting a quantity of the non-filtered responses.

FIG. 1 is a block diagram of a non-limiting example system 100 for filtered responses to memory operation messages, as described herein. The example system 100 is illustrative of any type of a computing system or computing device that includes a memory system 102 and a requestor 104, which initiates memory operation messages 106 to the memory system. The requestor 104 is, for example, any type of software, application, procedure, device function, device component, and/or system module that initiates the memory operation messages 106, such as read, modify, and write memory operations. Aspects of the described filtered responses to memory operation messages also applies to load requests and responses in a memory system. The memory system 102 includes a memory interface 108 (also referred to herein as a hardware-software (HW/SW) interface), which is the interface to a physical memory 110 of the memory system. The example system 100 is implementable in any number of different types of computing systems or computing devices, with various components, such as a device with a processor system and the memory system 102.

The physical memory 110 is any of a variety of volatile memory, such as dynamic random access memory (DRAM), or any of a variety of nonvolatile memory, such as resistive random access memory (e.g., memristors). The memory interface 108 manages the memory operation messages 106, such as modifying data, reading data from, and writing data to the physical memory 110. The memory interface 108 is, for example, a memory controller that receives the memory operation messages 106 from the requestor 104 and performs the corresponding read, modify, or write access to the physical memory 110 as requests 112 associated with the memory operation messages.

In this example system 100, the memory interface 108 includes a tracking logic component 114 that tracks the pending requests 112 until appropriate responses 116 to the data requests are returned from the physical memory 110 (e.g., requested data for a read access, or confirmation of a write or modify access). Although illustrated as a module or component of the memory interface 108, the tracking logic component 114 is implementable as an independent module or component, separate from the memory interface in the memory system 102. Aspects of the tracking logic component 114 implemented for filtered responses to memory operation messages are further shown and described with reference to FIGS. 4 and 5.

As indicated above, the transfer of data in memory of a computing system or computing device can be the dominant performance bottleneck for data throughput of memory operation messages, and the restriction limits computation performance for data throughput in a communication path 118 in the memory system 102. In this example system 100, the memory system 102 includes a filter component 120 in aspects of the techniques for filtered responses to memory operation messages. In one or more implementations, the filter component 120 receives the responses 116 to the requests 112 (e.g., initiated as the memory operation messages 106 from the requestor 104). The filter component 120 receives the responses 116 to the pending requests 112 for the memory operation messages 106 and identifies a filterable condition 122 of one or more of the responses. The filter component 120 filters the responses 116 based on the filterable condition 122 to reduce data throughput in the communication path 118 in the memory system. This reduces data traffic in the memory system 102 and improves performance, without delaying the messages on the response path.

Aspects of the tracking logic component 114 implemented for filtered responses to memory operation messages are further shown and described with reference to FIGS. 2 and 3. Although illustrated as a separate module or component of the memory system 102, the filter component 120 is implementable as an integrated module or component of the memory interface 108 or the physical memory 110. In one or more implementations, the filter component 120 includes independent processing, memory, and/or logic components functioning as a computing and/or electronic device integrated with the memory system 102 and/or with the example system 100. Alternatively, or in addition, the filter component 120 is implemented in software, in hardware, or as a combination of software and hardware components.

In this example, the filter component 120 is implemented as a software application, component, or module, such as executable software instructions (e.g., computer-executable instructions) that are executable with a processor system of a computing device or computing system to implement aspects of the techniques for filtered responses to memory operation messages, as described herein. As a software application, component, or module, the filter component 120 is stored on computer-readable storage memory (e.g., memory of a device), or in any other suitable memory device or electronic data storage implemented with the component or module. Alternatively, or in addition, the filter component 120 is implemented in firmware and/or at least partially in computer hardware. For example, at least part of the component or module is executable by a computer processor, and/or at least part of the component or module is implemented in logic circuitry.

In many computing systems and devices, a memory interface is a device node interconnect between devices on-chip, or the interconnect from on-chip to off-chip, that poses data movement restriction, such as for multiple requests 112 and multiple responses 116 across a communication path for data throughput, and the restriction limits computation performance in the communication path 118 in the memory system. In computing systems and/or devices, a higher bandwidth is typically available toward the top of the system (e.g., nearer the caches that are closer to the compute cores), as well as higher bandwidth toward the bottom of the system, where the memory structures support parallelism at the bank level and deeper in order to handle latencies, such as for row activation. This type of higher bandwidth is also exploited by a PIM.

Similarly, in distributed systems, the interconnect will often form a bottleneck, with higher data bandwidth available at the top and bottom of a system, which represents the bandwidth between devices in a cluster and between a device and its local memory. Many distributed systems are mapped in hierarchical topologies that are represented by the communication path restriction (e.g., a bottleneck) as shown generally at 124. Even for non-hierarchical interconnects, an interconnect is likely to be the source of a bottleneck when the overhead to scale all-to-all bandwidth to more nodes (O(n2)) is much greater than that to scale local bandwidth (O(n)). However, by adding logic on the return path as described herein, the amount of data returned for loads is reduced where the data values are only needed if they meet some condition (e.g., are nonzero).

In this example system 100, the filter component 120 receives the responses 116 to the requests 112 (e.g., initiated as the memory operation messages 106 from the requestor 104). The filter component 120 identifies the filterable condition 122 of one or more of the responses 116, and filters one or more of the responses 116 as the filtered responses 126 based on the filterable condition 122 to reduce data throughput in the communication path 118 in the memory system. In one or more implementations, the filtered responses 126 are filtered based on specified information in the responses. Alternatively, the filtered responses 126 are filtered based on configuration information (e.g., the filterable condition 122) programmed in the filter component 120. In one or more implementations, the filtered responses 126 have a value that does not satisfy the filterable condition 122, and the filtered responses are identified as determined to fail the filterable condition. In implementations, the value of a filtered response 126 is an element of data from the memory that will not be utilized by the requestor 104. Further, non-filtered responses 128 to the memory operation messages 106 have a value that satisfies the filterable condition 122, and the non-filtered responses 128 are communicated back through the communication path 118 and to the requestor 104.

In one or more implementations, the tracking logic component 114 reports a filtered response 126 back to the requestor as a negative acknowledgement (NACK) rather than as a data response. In an implementation, the tracking logic component 114 reports a group of the filtered responses 126 as negative acknowledgements grouped together, or as the negative acknowledgements appended to additional response messages. Alternatively, or in addition, the tracking logic component 114 counts a quantity of the filtered responses 126 with a counter and reports the quantity of the filtered responses 126 to the requestor. In an implementation, the tracking logic component 114 initiates a flush operation instructing the memory system 102 to cease the filtering and send pending filtered responses to their destination. These aspects of the tracking logic component 114 are further shown and described with reference to FIG. 3. In other aspects, the filter component 120 filters a response 116 that includes multiple elements, where at least some of the multiple elements of the response satisfy the filterable condition 122 and at least one of multiple elements does not satisfy the filterable condition. In this instance, the filter component is implemented to perform at least one of three operations, including to filter the response 116 if all of the multiple elements fail the filterable condition 122; filter the response 116 if requested elements of the multiple elements are filterable; or split the multiple elements based on individual filterability and condense non-filterable elements of the multiple elements into a response message.

FIG. 2 depicts non-limiting examples 200 of hardware-software (HW/SW) filter interface functions to reduce data transfer and alleviate throughput restriction of a communication path for memory operation messages in example implementations of filtered responses to memory operation messages, as described herein. In applications, a compute task reads multiple values from a remote memory location and filters the responses using a filtering function before they would otherwise have been transferred across a communication path, (e.g., a data transfer interface that is restrictive of data throughput). In many applications, a compute task reads multiple values from a remote location, but only utilizes the returned values that meet some condition. However, since the condition is dependent on the value, the memory system transfers all values across the bottleneck data transfer interface. If this condition is evaluated prior to the performance bottleneck, data transfer is reduced by dropping or summarizing values that do not satisfy the conditional.

In these examples 200, a code pattern is shown in pseudo-code as an implementation of filtering in existing serial codes for a fine-grain filter interface 202, with threads reserving a register and expecting a response for each element, and using a coarse-grain filter interface 204 that stores to a dedicated region of local or global memory, to be traversed when filtering is complete. The code iterates over an array and an "if" statement with a conditional on the value of each array element that guards some inner functionality. In these examples 200, the code updates a second array of values for each non-zero value from the first array, but both the conditional and the functional logic protected by the conditional can be any arbitrary functions. Note that there is independent work done in each iteration, and it is possible to avoid the serialization implied by the register dependency on R1 by launching a separate thread for each index (e.g., as is done for GPUs), by using register renaming to avoid false register dependences, or by unrolling the loop so that different registers are used for independent loads. Doing this can improve performance, but it increases memory bandwidth demand.

In aspects of the described filtered responses to memory operation messages, dynamically filtering the responses 116 on the return of the communication path 118 for a workload saves data bandwidth. In one or more implementations, this includes changes to the memory interface 108 (e.g., HW/SW interface), logic at a response node for filtering by the filter component 120, and the tracking logic component 114 as logic near the requestor 104 to handle filtered responses. Note that both the filter component 120 (e.g., logic at the response node) and the tracking logic component 114 (e.g., logic near the requestor 104) can be implemented via added hardware, firmware, software, or a combination thereof, assuming there is processing capability at a location.

With reference to changes to the memory interface 108 (e.g., HW/SW interface), dynamic filtering in the memory system is only performed for some memory accesses, so the hardware must rely on information from the software to determine when to implement this feature. The system conditions that benefit from the dynamic filtering depend on the specific implementation, but generally can reduce memory bandwidth demands to satisfy conditions, including (1) a condition that relies on one element of data from memory; (2) a condition that can be evaluated on the memory side of the data bottleneck; and (3) the loaded data will not be used for anything else if the condition is not satisfied. This final condition is not necessary for the functionality of the filtering, but can be necessary for improving performance. If it is determined that dynamic filtering is feasible and beneficial for an access, the software can indicate that the access is filterable and potentially specify the filter conditional that must be evaluated. However, if only one conditional operation is supported by hardware, then this second task is not needed. This could be specified in multiple ways.

In one or more implementations, the access semantics are not changed, in that filtered requests are identified and the associated destination register is filled with a NULL value that is known to fail the conditional, however the load must still be annotated to indicate it can be filtered. This can be done via bits in the instruction itself or based on the address via bits in the page table or an address range check (e.g., if an entire structure is only accessed with filterable loads). The conditional to be evaluated can be programmed as a collection of arithmetic and/or comparison operations to the filter components on the return path ahead of time, or it can be specified via a conditional ID in the memory request, which assumes only a limited number of conditionals are supported, either hardwired or programmed in a table ahead of time.

In an alternative one or more implementations, a common filtering code pattern is offloaded to a specialized hardware unit. For example, a loop that evaluates a condition on each element of an array and counts and/or stores the indices of and/or stores the values of only the elements that meet that condition can be implemented entirely in hardware. In this case, the operation is triggered by a new instruction or system call that launches the function, potentially after configuring the inputs to the operation (e.g., base address, size). If the stack fills up, the function can dynamically resize the stack, or return a "stack full" rather than "complete" return value, and the launching thread processes the existing stack before calling the filter function again. Similarly, a pipelined parallel execution model can be implemented, with the filtering agent synchronizing with the consumer of filtered values via atomic accesses to the stack structure. In aspects of these implementations, the described filtering mechanisms can be manually identified, or identified by the compiler based on pattern matching in the CFG and/or expression tree analysis for conditional inputs.

Figure 3:
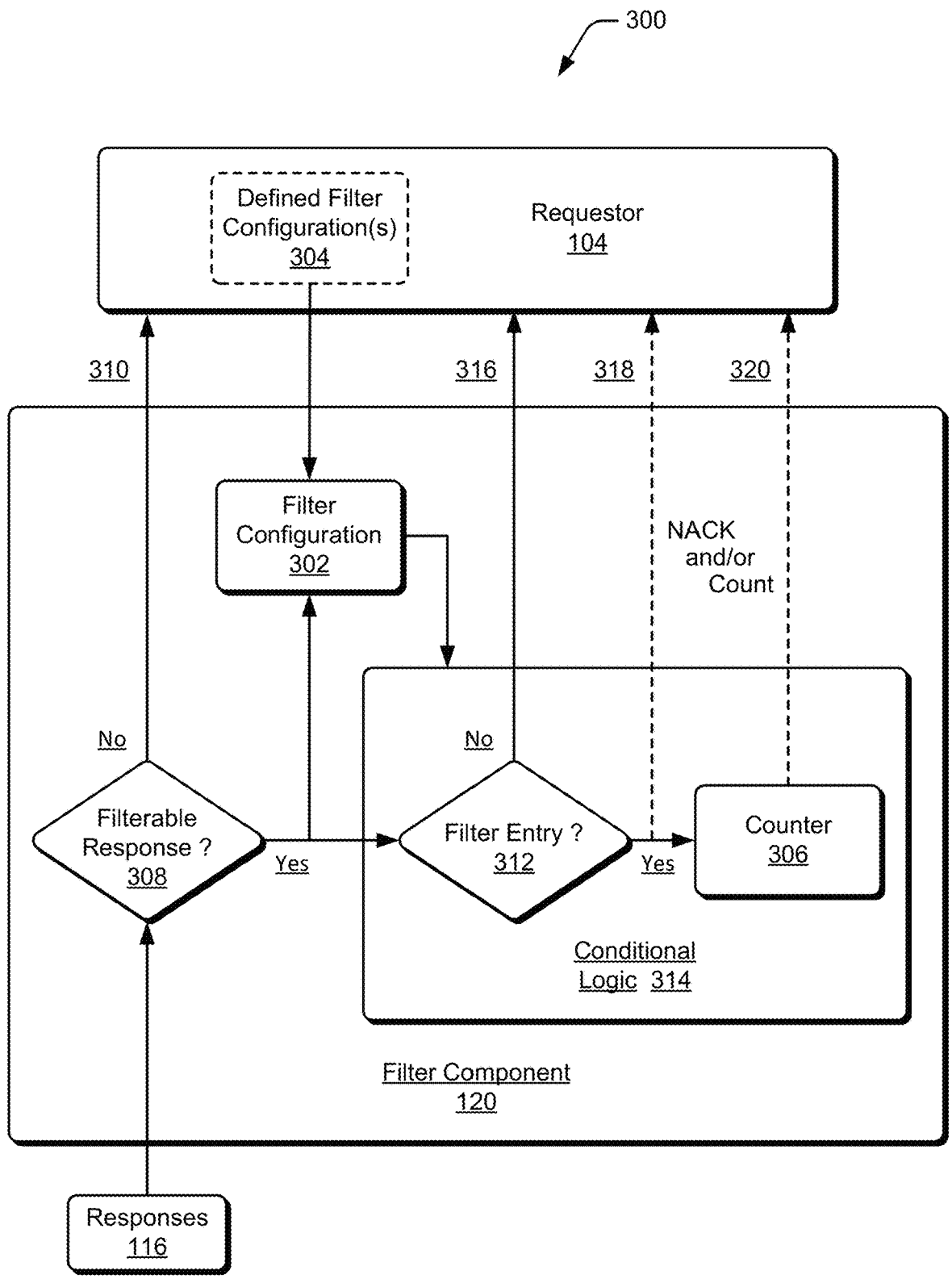
FIG. 3 depicts a non-limiting example of a filter component for filtering data at a response node in an example implementation of filtered responses to memory operation messages, as described herein.

FIG. 3 depicts a non-limiting example 300 of a filter component for filtering data at a response node in an example implementation of filtered responses to memory operation messages, as described herein. As described above, the filter component 120 is implemented to receive the responses 116, identify a filterable condition 122 of one or more of the responses, and filter the responses (e.g., as the filtered responses 126) based on the filterable condition 122. The filter component 120 detects the filterable responses, compresses or drops those that don't satisfy the desired condition, and notifies the requestor 104 that they have been filtered. In one or more implementations, filterable responses are used to evaluate a conditional, which can be defined based on response metadata and/or based on a programmable filter configuration 302, and which operates on the response data itself. In this example 300, the requestor 104 provides one or more defined filter configurations 304 to program or update the filter configuration 302 of the filter component 120. Alternatively, or in addition, a counter 306 is utilized to keep track of the filtered responses 126, and this count is communicated back to the requestor 104 and reset periodically or at pre-defined events.

In an implementation, the filter component 120 receives one or more of the responses 116 and determines at 308 whether a received response is filterable. The filterable responses and conditional functions can be identified based on information in a response message itself and/or based on the filter configuration information that has been programmed into the filter component. In implementations, a response 116 is designated as filterable based on a bit in the response message (e.g., as assigned to the request type earlier near the requestor), or the host programs the filter component 120 in advance to consider all responses that target a specified address range or come from a requestor and/or thread ID as filterable. The conditional filtering function can similarly be specified based on information in the response message (e.g., a conditional ID assigned by the requestor 104 that indexes into a static or programmable conditional operation table), or it can be pre-programmed into the filter component 120 to be used for all filterable responses, or all filterable responses to a specific address range or to a specific requestor and/or thread.

If a received response 116 is determined as not being filterable (i.e., No from 308), then the response 116 is passed through at 310 and returned to the requestor 104. If a received response 116 is determined to be filterable (i.e., Yes from 308), then at 312, conditional logic 314 of the filter component 120 evaluates the filter entry for specified conditionals. In implementations, the supported functionality is a fixed set of simple conditionals (e.g., comparator operators with a constant or programmable comparison value), or is more programmable, such as a set of arithmetic operations and programmable registers that are combined in a wider variety of ways for evaluation, or as a custom instruction set architecture (ISA) for evaluating more complex operations on data response values. In implementations, the conditional can also be updated based on previously considered response messages (e.g., for a MAX function, updating the comparison value in a "greater-than" conditional each time a larger value is seen).

If the received response 116 does not satisfy a filter entry (i.e., No from 312), then the associated response data of the response 116 is passed through at 316 and returned to the requestor 104. If the received response 116 is determined to satisfy a filter entry (i.e., Yes from 312), then the counter 306 counts the filtered response. The filter component 120 avoids returning the associated response data to the requestor 104 and notifies the requestor that the response has been filtered. In an implementation, and for data responses that are of variable size, the filter component 120 communicates a smaller NACK message to the requestor at 318 in place of the data response. The filter component 120 can also pack multiple NACKs together for communication back to the requestor. Alternatively, the counter 306 of the filter component 120 keeps track of how many responses 116 back to a requestor 104 have been filtered, and the filter component 120 then periodically (or at specific events, such as a flush request sent by the requestor) communicates a count message to the requestor at 320 indicating how many of the responses 116 have been filtered. These NACK and count messages can also be piggy-backed (e.g., appended) on normal data responses and communicated to the requestor.

In some implementations, if the received response 116 does satisfy a filter entry, location information of the response (e.g., its address) is sent back in place of or in addition to the response data. In some cases, a count of the non-filtered responses is maintained similar to the counter used for filtered responses as described above and sent back in place of or in addition to data responses.

Figure 4:
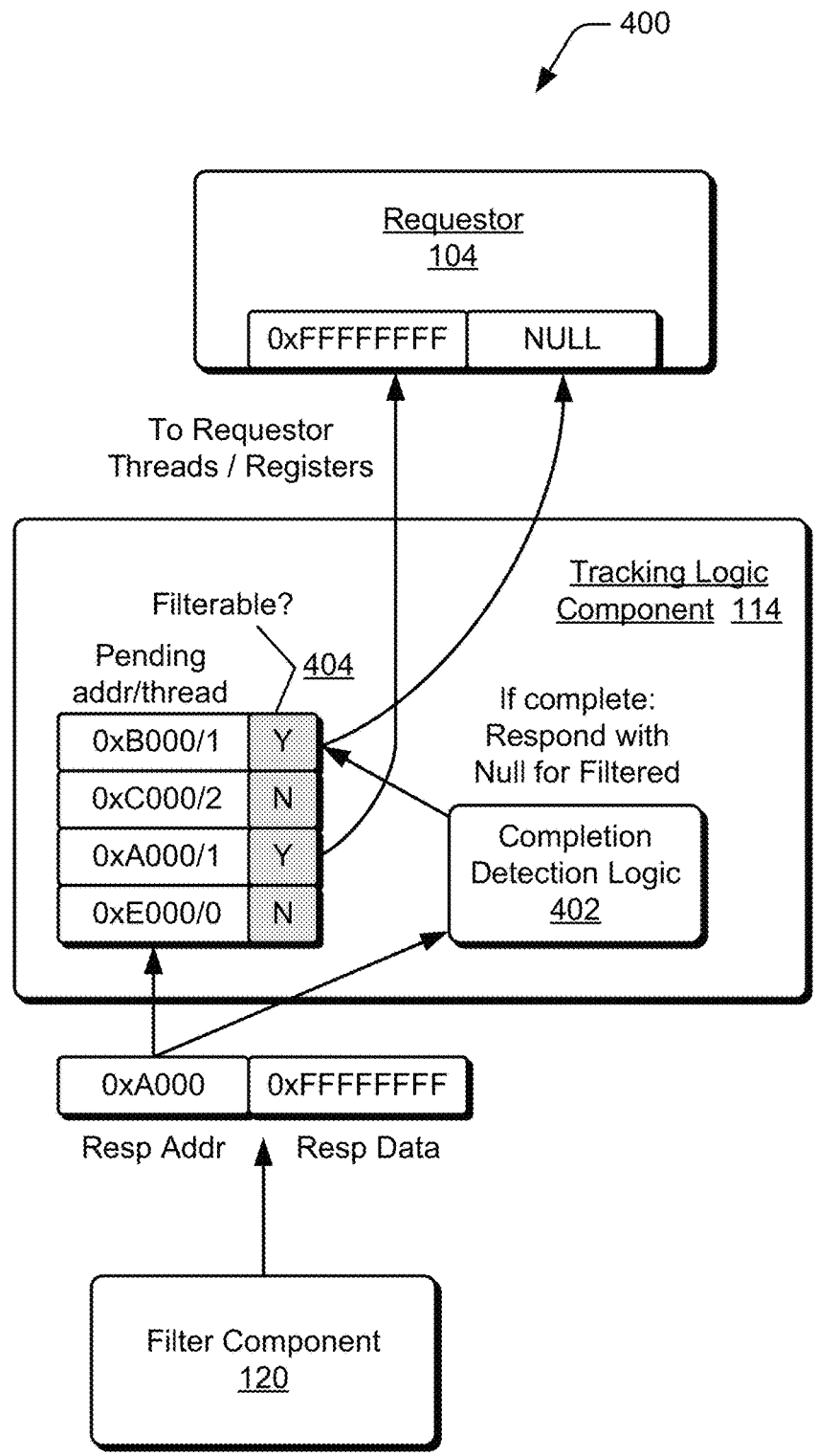
FIG. 4 depicts a non-limiting example of a tracking logic component for tracking pending requests and response completion in an example implementation of filtered responses to memory operation messages, as described herein.

FIG. 4 depicts a non-limiting example 400 of a tracking logic component 114 for tracking pending requests and response completion in an example implementation of filtered responses to memory operation messages, as described herein. In a conventional von Neumann system, information about each pending data request is tracked until the associated response is returned to the requestor 104, at which point the information is used to direct the response to the appropriate thread or register. However, in aspects of the described dynamic filtering, some responses that have been filtered will not be returned, and the tracking logic component 114 is implemented to provide a mechanism to prevent the requestor 104 from waiting indefinitely for the responses that are not returned. In this example 400, the requestor 104 assumes that each request will produce a separate response (e.g., the fine-grain filter interface 202), and if a response is filtered, a NULL value is communicated as a response from the tracking logic component. This reuses much of the conventional pending request tracking logic that exists in current cores, but with the addition of completion detection logic 402 and a filterable indication 404 for each pending response address or thread. Based on the filterable indication 404 for a pending address or thread, the tracking logic component 114 can track a request from the requestor 104 that is processed and returned as a response (to the request) from the filter component 120. Accordingly, the tracking logic component 114 can detect and track when the filtered responses to the requests are completed. The completion detection logic 402 is implemented to determine whether the filtered responses to the requests are complete and returned to the requestor.

In one or more implementations, the memory interface 108 (e.g., a HW/SW interface) assumes that a separate response 116 will be returned for each filtered response (e.g., the fine-grain filter interface 202). The tracking logic component 114 enhances the pending response tracking with the counter 306 for pending filtered responses, which is incremented whenever a filtered response to a request is issued. The counter 306 for tracking pending filtered responses is implemented as a component or module of the completion detection logic 402. When a filtered response (e.g., non-filtered value or NACK/count indicating filtered values) arrives at the requestor 104, this new pending filterable counter is decremented by the number of responses indicated by the response (e.g., one (1) for a non-filtered response or NACK, the count for a count value). If the counter reaches zero, then all pending filtered responses to requests have been satisfied, the completion detection logic 402 traverses the pending filtered responses to the requests and responds to the associated threads and/or registers of the requestor with a NULL value.

In another implementation, filterable response completion is detected by use of labels, which are defined to identify individual pending filterable responses to requests. A label is defined based on a thread ID or address corresponding to a request and associated filtered response, or simply based on the index in the pending request table. When a response 116 is filtered, the label associated with each filtered response is either sent back immediately with a NACK response to the requestor 104, or it is combined with subsequent responses (filtered or non-filtered). When a filtered response arrives at the requestor 104, all associated labels are unpacked and the pending filtered responses to the requests are responded to individually. This adds metadata overhead to the responses 116, but allows forward progress for each individual filtered response before all filtered responses return, and it frees up use of pending table entries during that time. Labels can also be associated with coarser grain groups of responses (e.g., responses from the same thread) and used with a per-group counter to determine filtered response completion at a finer granularity than the single counter implementation described above. In this case, multiple threads are allowed to progress independently when both have pending filtered responses to requests, and/or they are used at response nodes to apply different filtering rules for different threads.

In another implementation, filtered response completion is detected without the use of counters or labels in the filtered response messages by instead ensuring that all pending filtered responses have been satisfied before responding to pending filtered response threads or registers with NULL values, as described above. If ordering is established between all filterable requests and filtered responses in the system (e.g., filterable requests bypass caches and use static routing), then this can be accomplished by simply waiting for the final response to return, where this response is not considered filterable by the filter component, but rather must be ordered with respect to the filtered responses). Alternatively, this is accomplished by the completion detection logic 402 of the tracking logic component 114 sending a probe command to all of the filter nodes that have filtering enabled (e.g., assumes ordering between the probe command to all filter nodes that have filtering enabled), or, if a periodic flush of filter count is performed at the filter nodes, waiting a threshold amount of time proportional to the flush frequency before assuming that all pending filtered responses have been flushed (e.g., this assumes there is a finite maximum network latency on the return path).

Figure 5:
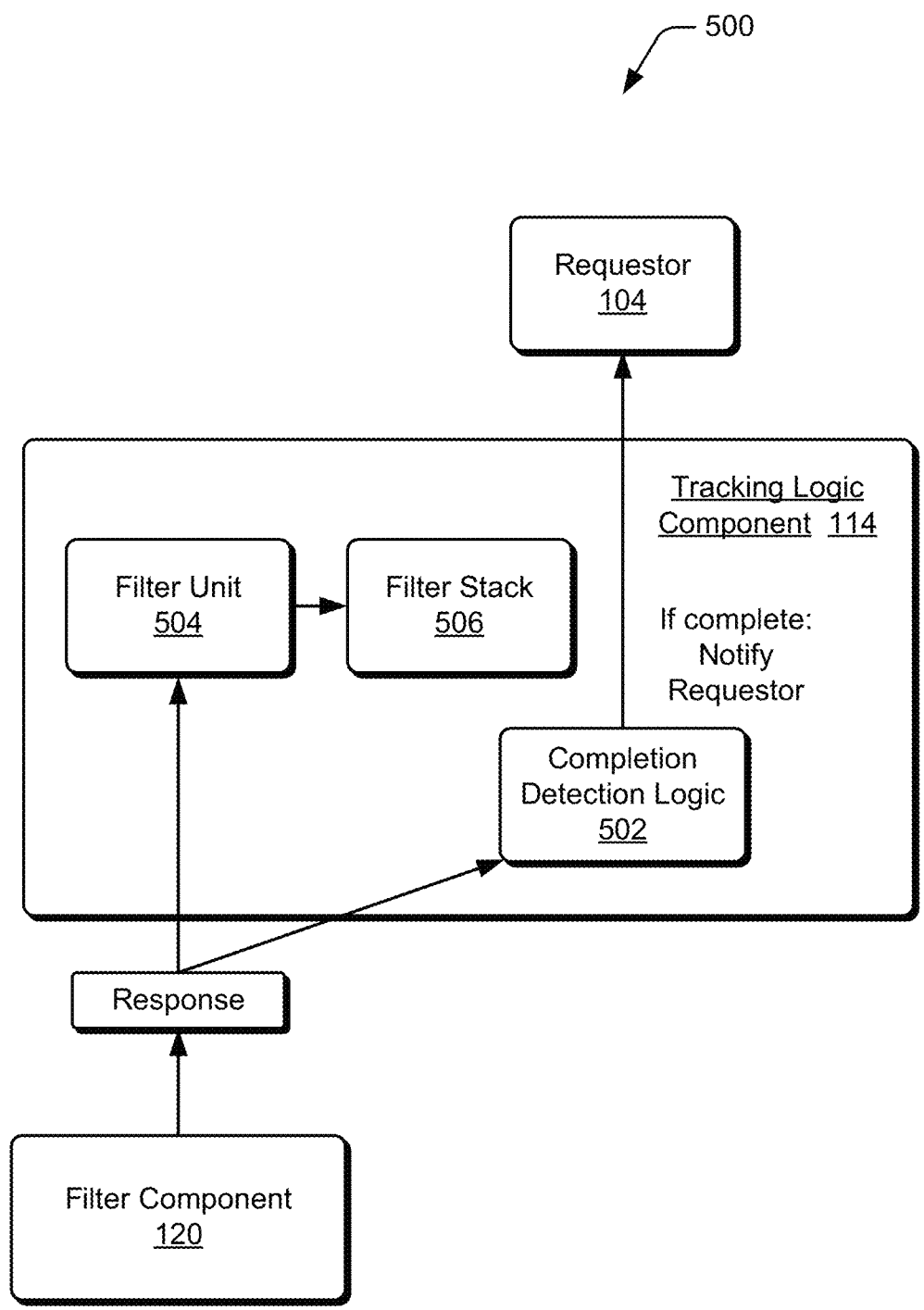
FIG. 5 depicts another non-limiting example of a tracking logic component for tracking pending requests and response completion in an example implementation of filtered responses to memory operation messages, as described herein.

FIG. 5 depicts a non-limiting example 500 of a tracking logic component 114 for tracking pending requests and response completion in an example implementation of filtered responses to memory operation messages, as described herein. In this example 500, the requestor 104 assumes that only a single response will be returned (e.g., the coarse-grain filter interface 204), indicating the completion of the filter operation and a structure holding non-filtered values or response metadata. This represents a separate tracking logic in the tracking logic component 114 for filtered responses, which in some implementations, includes completion detection logic 502, a filter unit 504, and a filter stack 506. The completion detection logic 502 is implemented to determine whether filtered responses are complete.

In one or more implementations, either of the methods described above with reference to FIG. 4 are used to determine when all pending filtered responses to requests have been returned (e.g., by using a counter, labels, or a probe command), but the memory interface 108 (HW/SW interface) does not require a separate NULL response for every individual request. Instead, if the memory interface 108 implemented as the coarse-grain filter interface 204 is used, each non-filtered response and/or responses metadata (address/offsets) can be pushed to the filter stack 506 residing in global memory, scratchpad memory, or in a dedicated storage structure by a near-requestor filter component, to be read from at the completion of the coarse-grain filter operation. Although referred to as a filter stack, a FIFO queue, tree, or any other storage structure can be utilized.

The filter component 120 also evaluates the conditional on non-filtered response values, in the event they have not already been evaluated in a response filter node (e.g., where they are locally cached on the near side of the bottleneck). This implementation necessitates a HW/SW interface change, but avoids the need for the NULL responses as described with reference to the implementation shown in FIG. 4 (i.e., this is replaced with a single completion signal when all filtered responses to the requests have completed). Depending on the HW/SW interface, this logic can also be responsible for issuing filtered responses to the requests, and potentially accessing other addresses based on the returned, unfiltered values and/or indices.

Additionally, aspects of the described techniques for filtered responses to memory operation messages include implementation of a filtering fence, implemented by the tracking logic component 114 to trigger a flush operation of filtered responses and prevent further filterable request issues and/or filter node recognition until all pending filtered responses to current requests have completed. In implementations, the tracking logic component 114 initiates a flush operation instructing the memory system to cease the filtering and send pending filtered responses to their destination. With respect to cache considerations, aspects of the described techniques have minimal (e.g., little to none) impact on cache coherence. The filtered responses can hit in the cache or retrieve valid data from memory and are treated the same as a data response if they are not filtered. The filtered responses (e.g., as NACKs or counts) are treated as normal responses, except that they do not provide valid cache data. However, in most modern memory systems, data is generally transferred at cache block granularity, which means a response message contains multiple elements that can be filtered.

In one or more implementations, the memory system 102 accommodates when some elements in a cache block satisfy the filter condition and some do not, such as by full-block filtering, request-mask filtering, and packed filtering. In an implementation of the full-block filtering, the filter component 120 at a filter node only filters a response message if all elements in the associated cache block fail the filter conditional. This reduces the amount of data filtered, since a cache block will not be filtered if even one element is not filterable, but does result in a simpler implementation that does not involve splitting data blocks. In an implementation of the request-mask filtering, a request initiated as a memory operation message 106 specifies which element(s) or byte(s) the requestor 104 actually needs returned, similar to a write mask used for write-through store requests in a GPU cache hierarchy. Based on this, the filter component 120 filters a response 116 if all requested elements are filterable. This provides more precise filtering for sparse or strided access patterns, but does involve additional per-element information to be sent with each request. This implementation should also capture expected spatial locality.

In an implementation of the packed filtering, the filter component 120 at a filter node splits response elements based on individual filterability and actively condenses only non-filterable elements into response messages. In addition to the non-filtered elements, offset information is added to the response message (e.g., bitmask or offset index relative the specified response address or relative the last non-filterable address) to allow near-requestor logic (and potentially cache controller logic) to unpack and correctly route each non-filtered element. If the system supports variable-sized response messages, packing entails removing filtered elements, adding offset information, and sending the smaller response message in place of the original message. Otherwise, non-filterable elements could be delayed and packed with non-filterable elements from subsequent responses into a fixed-size response message. In this case, offset information is specified relative to a base response address (in which case only responses for addresses that differ by less than some threshold are packed, to limit offset bits required), or multiple base response addresses are specified in the packed response with offsets relative each base.

As these packed messages traverse the response path, they are not placed in caches unless the caches can specify valid state at element granularity. Therefore, this strategy could limit cache reuse if temporal locality exists. When packed messages arrive at the requestor 104, logic that has been implemented calculates the address of each packed element and routes it to the appropriate storage location (e.g., a filter stack). The filter component 120 at a filter node can determine whether to pack filterable responses in this way based on multiple factors, such as based on a threshold for a number of filtered requests to ensure that some minimum bandwidth reduction is met; based on some threshold delay for delaying and packing multiple responses, after which the original request will be sent unchanged if no subsequent packable message is found; and/or taking into account locality information (or expected locality information) from the requestor to enable or disable packing, or to modulate any of the above thresholds.

With reference to collaboration with other filtering techniques, compute-near-data solutions, such as computation storage and PIM, can implement some degree of filtering when the data is fetched from storage or memory. In an implementation, the proposed described techniques can be implemented to collaborate with such compute-near-data solutions to distribute the filtering operations between them. The distribution of the filtering operations can be based on performing different checks at each of them. Alternatively, the data (e.g., filtered responses) is distributed to be filtered among implementations of the filtering techniques.

Figure 6:
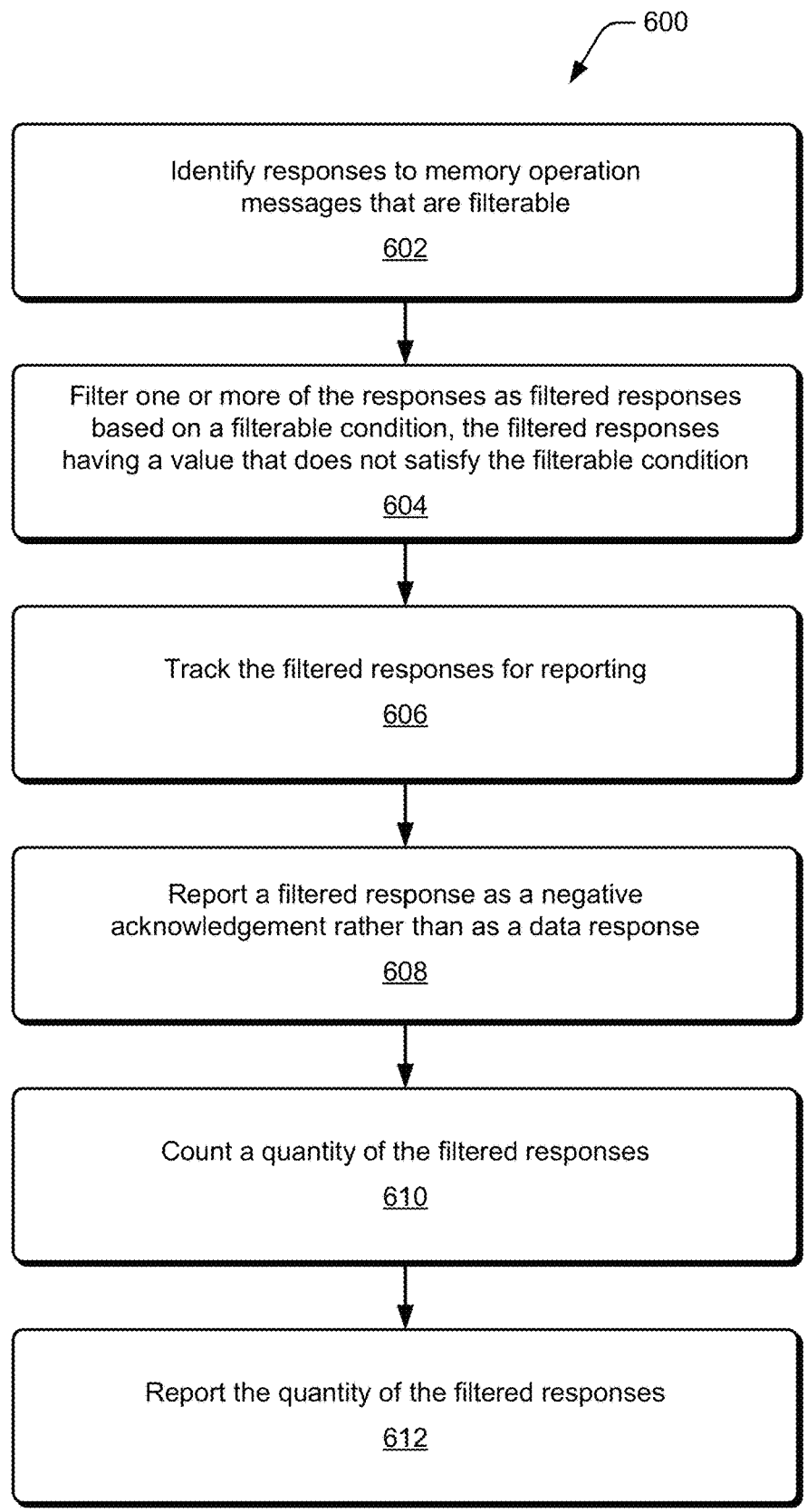
FIGS. 6-8 depict procedures in example implementations for filtered responses to memory operation messages, as described herein.

FIG. 6 is a flow diagram depicting a procedure 600 in an example implementation of filtered responses to memory operation messages, as described herein. The order in which the procedure is described is not intended to be construed as a limitation, and any number or combination of the described operations are performed in any order to perform the procedure, or an alternate procedure.

In the procedure 600, responses to memory operation messages that are filterable are identified (at 602). For example, the filter component 120 identifies responses 116 to the memory operation messages 106 that are filterable, such as to reduce data throughput in the memory system 102. In an implementation, the one or more responses 116 are identified as being filterable responses based on specified information in the one or more responses and/or or based on configuration information programmed in the filter component.

One or more of the responses are filtered (e.g., as filtered responses) based on a filterable condition, the filtered responses having a value that does not satisfy the filterable condition (at 604). For example, the filter component 120 filters one or more of the responses 116 as the filtered responses 126 based on the filterable condition 122, where the filtered responses having a value that does not satisfy the filterable condition. In an implementation, the value of a filtered response 126 is an element of data from the memory that will not be utilized by the requestor 104 that initiates the memory operation messages 106.

The filtered responses are tracked for reporting (at 606). For example, the tracking logic component 114 tracks the filtered responses 126 for reporting, such as for reporting back to a requestor 104 that initiates the memory operation messages 106. A filtered response is reported as a negative acknowledgement rather than as a data response (at 608).

For example, the tracking logic component 114 reports a filtered response 126 back to the requestor 104 as a negative acknowledgement rather than as a data response. Alternatively, a group of the filtered responses are reported as NACKs grouped together, or as the negative acknowledgements appended to additional response messages. A quantity of the filtered responses are counted (at 610), and the quantity of the filtered responses are reported (at 612). For example, the counter 306 counts a quantity of the filtered responses 126, and the filter component 120 reports the quantity of the filtered responses 126 back to the requestor 104.

Figure 7:
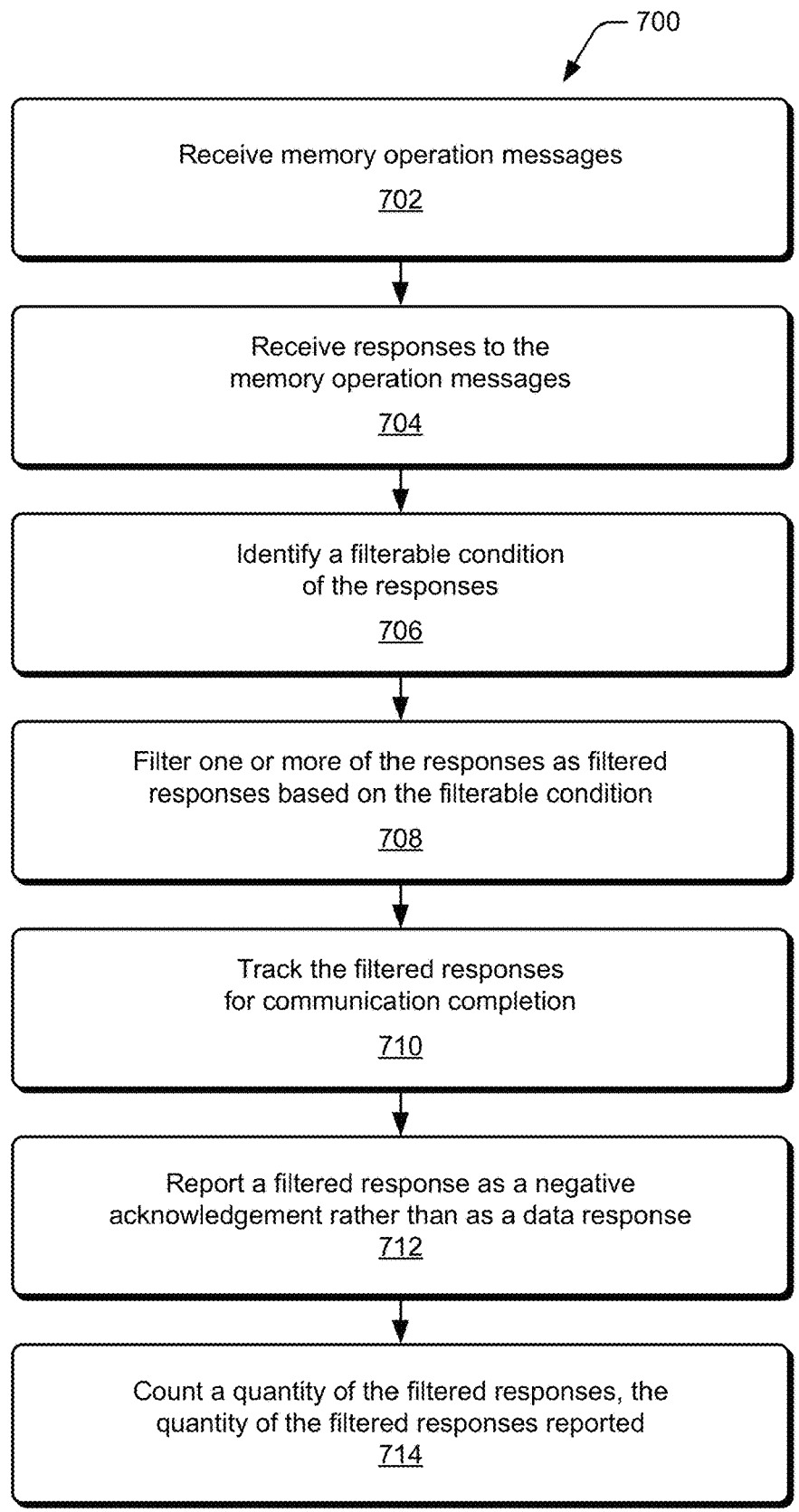

FIG. 7 is a flow diagram depicting a procedure 700 in an example implementation of filtered responses to memory operation messages, as described herein. The order in which the procedure is described is not intended to be construed as a limitation, and any number or combination of the described operations are performed in any order to perform the procedure, or an alternate procedure.

In the procedure 700, memory operation messages are received (at 702). For example, the memory system 102 receives the memory operation messages 106, such memory operation messages as issued by the requestor 104. Responses to the memory operation messages are received (at 704). For example, the filter component 120 receives the responses 116. A filterable condition of the responses is identified (at 706). For example, the filter component 120 identifies the filterable condition 122 of the responses.

One or more of the responses are filtered (e.g., as filtered responses) based on the filterable condition (at 708). For example, the filter component 120 filters one or more of the responses 116 as the filtered responses 126 based on the filterable condition 122, such as to reduce data throughput in the communication path 118 in the memory system 102. In an implementation, the filter component 120 filters the filtered responses 126 based on specified information in the one or more responses and/or the filter component 120 filters the filtered responses 126 based on configuration information programmed in the filter component. In an implementation, the filter component 120 filters a response 116 that includes multiple elements, where one or more of the multiple elements of the response satisfy the filterable condition 122 and at least one of multiple elements does not satisfy the filterable condition. In alternative options, the filter component 120 filters the response if all of the multiple elements fail the filterable condition; filters the response if requested elements of the multiple elements are filterable; or splits the multiple elements based on individual filterability and condenses non-filterable elements of the multiple elements into a response message.

The filtered responses are tracked for communication completion (at 710). For example, the tracking logic component 114 tracks the filtered responses 126 for reporting, such as for reporting back to the requestor 104 that initiates the memory operation messages 106. A filtered response is reported as a negative acknowledgement rather than as a data response (at 712). For example, the tracking logic component 114 reports a filtered response 126 (e.g., back to the requestor 104) as a negative acknowledgement rather than as a data response. A quantity of the filtered responses are counted, and the quantity of the filtered responses are reported (at 714). For example, the counter 306 counts a quantity of the filtered responses 126, and the filter component 120 reports the quantity of the filtered responses 126, such as back to the requestor 104.

Figure 8:
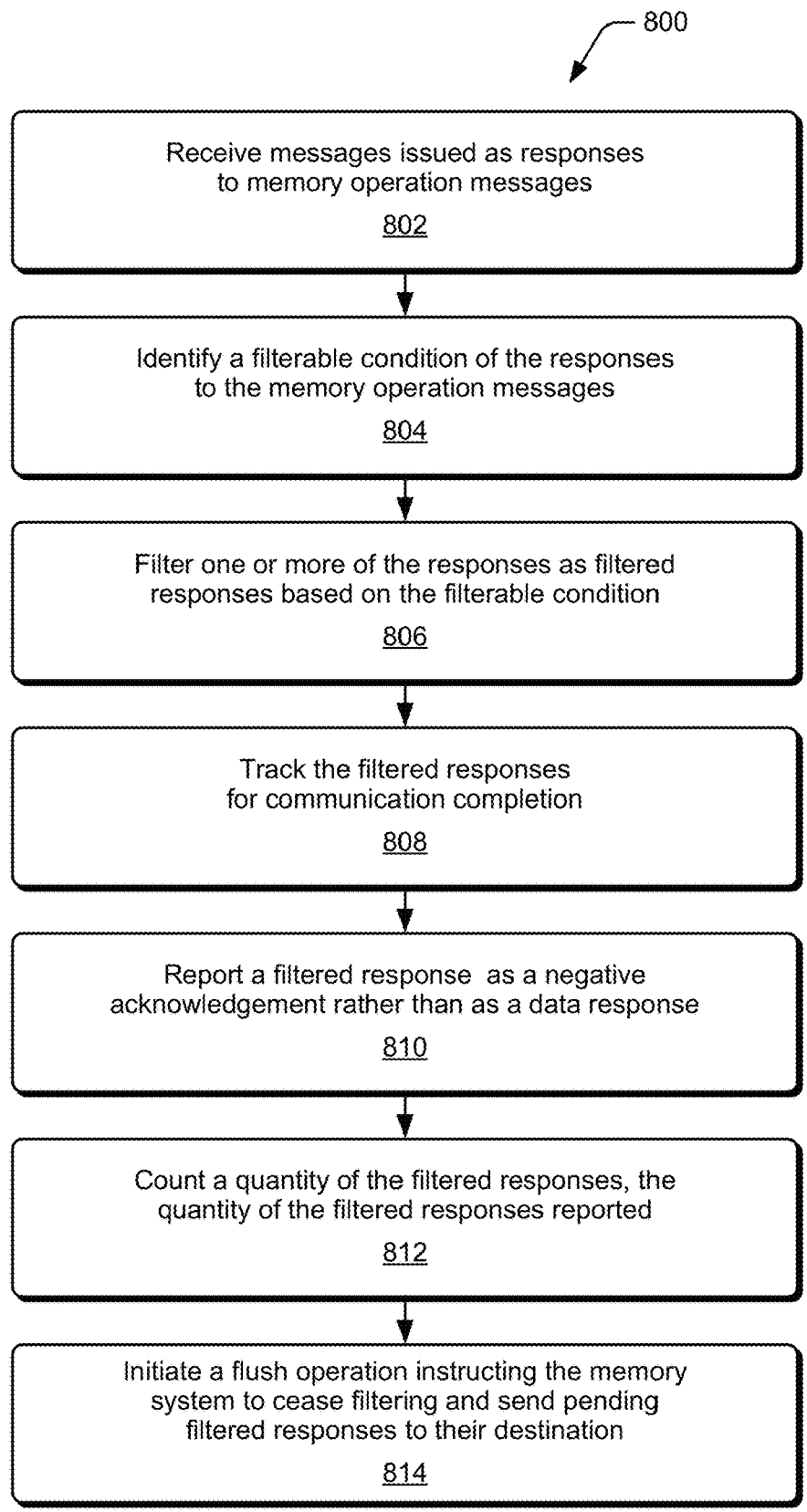

FIG. 8 is a flow diagram depicting a procedure 800 in an example implementation of filtered responses to memory operation messages, as described herein. The order in which the procedure is described is not intended to be construed as a limitation, and any number or combination of the described operations are performed in any order to perform the procedure, or an alternate procedure.

In the procedure 800, messages issued as responses to memory operation messages are received (at 802). For example, the filter component 120 receives the responses 116 to the memory operation messages 106, such as the memory operation messages issued by the requestor 104. A filterable condition of the responses to the memory operation messages is identified (at 804). For example, the filter component 120 receives the responses 116 to the memory operation messages 106 and identifies a filterable condition 122 of the responses.

One or more of the responses are filtered (e.g., as the filtered responses) based on the filterable condition (at 806). For example, the filter component 120 filters one or more of the responses 116 as the filtered responses 126 based on the filterable condition 122, such as to reduce data throughput in the communication path 118 in the memory system 102. In an implementation, the filtered responses 126 are filtered based on specified information in the one or more responses and/or the filtered responses 126 are filtered based on configuration information programmed in the filter component 120. In one or more implementations, the filtered responses 126 have a value that does not satisfy the filterable condition 122 and/or the filtered responses 126 are identified as determined to fail the filterable condition. The value of a filtered response 126 is an element of data from the memory that will not be utilized by the requestor 104. Alternatively, the non-filtered responses 128 to the memory operation messages have a value that satisfies the filterable condition 122, and the non-filtered responses are communicated back through the communication path to the requestor.

The filtered responses are tracked for communication completion (at 808). For example, the tracking logic component 114 tracks the filtered responses 126 for communication completion, such as back to the requestor 104 of the memory operation messages 106. A filtered response 126 is reported as a negative acknowledgement rather than as a data response (at 810). For example, the tracking logic component 114 reports a filtered response 126 (e.g., to the requestor 104) as a NACK rather than as a data response. Alternatively, a group of the filtered responses are reported as NACKs grouped together, or as the negative acknowledgements appended to additional response messages. A quantity of the filtered responses are counted, and the quantity of the filtered responses are reported (at 812). For example, the counter 306 counts the quantity of the filtered responses 126, and the quantity of the filtered responses is reported, such as to the requestor 104. Further, in an implementation, the memory system is instructed to cease filtering and send pending filtered responses to their destination based on a flush operation (at 814). For example, the tracking logic component 114 initiates the flush operation to cease the filtering and initiate the pending filtered responses being sent to their destination (e.g., back to the requestor 104 of the memory operation messages).

The various functional units illustrated in the figures and/or described herein (including, where appropriate, the memory system 102, the memory interface 108, the tracking logic component 114, and the filter component 120) are implemented in any of a variety of different forms, such as in hardware circuitry, software, and/or firmware executing on a programmable processor, in a microcontroller, or any combination thereof. The procedures provided are implementable in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although implementations of filtered responses to memory operation messages have been described in language specific to features, elements, and/or procedures, the appended claims are not necessarily limited to the specific features, elements, or procedures described. Rather, the specific features, elements, and/or procedures are disclosed as example implementations of filtered responses to memory operation messages, and other equivalent features, elements, and procedures are intended to be within the scope of the appended claims. Further, various different examples are described herein and it is to be appreciated that many variations are possible and each described example is implementable independently or in connection with one or more other described examples.

What is claimed is:

1. A memory system configured to:
   generate a filtered response by filtering a response to a read request submitted by a processor, the filtering being based on the response having at least one element of data that will not be utilized by the processor; and
   track the filtered response for communication completion.

2. The memory system of claim 1, wherein the response fails a filterable condition or have includes a value that does not satisfy the filterable condition.

3. The memory system of claim 1, wherein the response is filtered based on at least one of specified information in the response, or configuration information programmed in the memory system.

4. The memory system of claim 1, further configured to:
   receive an additional response to an additional read request that satisfies a filterable condition; and
   communicate the additional response as a non-filtered response back through a communication path in the memory system.

5. The memory system of claim 1, further configured to report the filtered response as a negative acknowledgement rather than as a data response.

6. The memory system of claim 1, further configured to:
   generate filtered responses by filtering responses to read requests;
   count a quantity of the filtered responses; and
   report the quantity of the filtered responses.

7. The memory system of claim 1, further configured to initiate a flush operation causing the memory system to cease filtering and send one or more pending filtered responses to respective destinations.

8. The memory system of claim 1, wherein the filtering includes condensing one or more non-filterable elements of the data into the filtered response that excludes the at least one element.

9. The memory system of claim 1, wherein the at least one element of data that will not be utilized by the processor is read responsive to the read request.

10. A computing device, comprising:
    a memory system to:
       receive a read request;
       generate a response to the read request; and
       generate a filtered response by filtering the response based on at least one of specified information in the response, or configuration information programmed in the memory system.

11. The computing device of claim 10, wherein the memory system is further configured to track the filtered response for communication completion.

12. The computing device of claim 11, wherein the memory system is configured to report the filtered response as a negative acknowledgement rather than as a data response.

13. The computing device of claim 11, wherein the memory system is further configured to:
    generate filtered responses by filtering responses to read requests;
    count a quantity of the filtered responses; and
    report the quantity of the filtered responses.

14. The computing device of claim 10, wherein the response includes multiple elements, one or more of the multiple elements of the response satisfy a filterable condition, and at least one of the multiple elements does not satisfy the filterable condition, wherein the memory system is configured to:
    filter the response if all of the multiple elements do not satisfy the filterable condition;
    filter the response if requested elements of the multiple elements do not satisfy the filterable condition; or
    split the multiple elements based on individual filterability and condense non-filterable elements of the multiple elements into a response message.

15. A method, comprising:
    generating a filtered response by filtering a response to a read request based on a filterable condition; and
    reporting the filtered response as a negative acknowledgement rather than as a data response.

16. The method of claim 15, wherein the response is identified as being a filterable response based on at least one of specified information in the response, or configuration information programmed in a memory system configured to filter the response.

17. The method of claim 15, wherein the response includes an element of data from memory that will not be utilized by a processor responsive to the read request.

18. The method of claim 15, further comprising:
    generating filtered responses by filtering responses to read requests; and
    reporting a group of the filtered responses as at least one of negative acknowledgements grouped together, or as the negative acknowledgements appended to additional response messages.

19. The method of claim 15, further comprising:
    generating filtered responses by filtering responses to read requests;
    counting a quantity of the filtered responses; and reporting the quantity of the filtered responses.

20. The method of claim 15, wherein the filterable condition includes one or more of an equal to condition, a not equal to condition, a greater than condition, a less than condition, and a non-zero condition.

\* \* \* \* \*